United States Patent [19]
Barker et al.

[11] 3,835,882
[45] Sept. 17, 1974

[54] FLOAT VALVE ASSEMBLY

[75] Inventors: Bernard A. Barker, Monticello, Iowa; Ronald L. Daggett, Madison, Wis.

[73] Assignee: Franklin Equipment, Inc., Monticello, Iowa

[22] Filed: Oct. 15, 1973

[21] Appl. No.: 406,607

[52] U.S. Cl................. 137/445, 137/451, 251/279
[51] Int. Cl............................................... F16k 31/26
[58] Field of Search .......... 137/434, 437, 442, 443, 137/444, 445, 446, 451; 251/279

[56] References Cited
UNITED STATES PATENTS

| | | | |
|---|---|---|---|
| 236,311 | 1/1881 | Doherty.......................... | 137/445 X |
| 2,766,770 | 10/1956 | Dickinson.......................... | 137/437 |
| 2,827,917 | 3/1958 | Cripe.............................. | 137/445 X |

Primary Examiner—William R. Cline
Assistant Examiner—David R. Matthews
Attorney, Agent, or Firm—Rudolph L. Lowell

[57] ABSTRACT

The valve assembly is of an all plastic construction and requires no tools for normal disassembly and service purposes. A valve plunger having a replaceable and reversible seat member is actuated by a pair of coacting pivoted lever members which are moved by a float arm unit to valve opening and closing positions. On manual movement of the lever members to a third servicing position the valve plunger is readily removable from the valve assembly for servicing or replacement of the seat member thereon.

6 Claims, 7 Drawing Figures

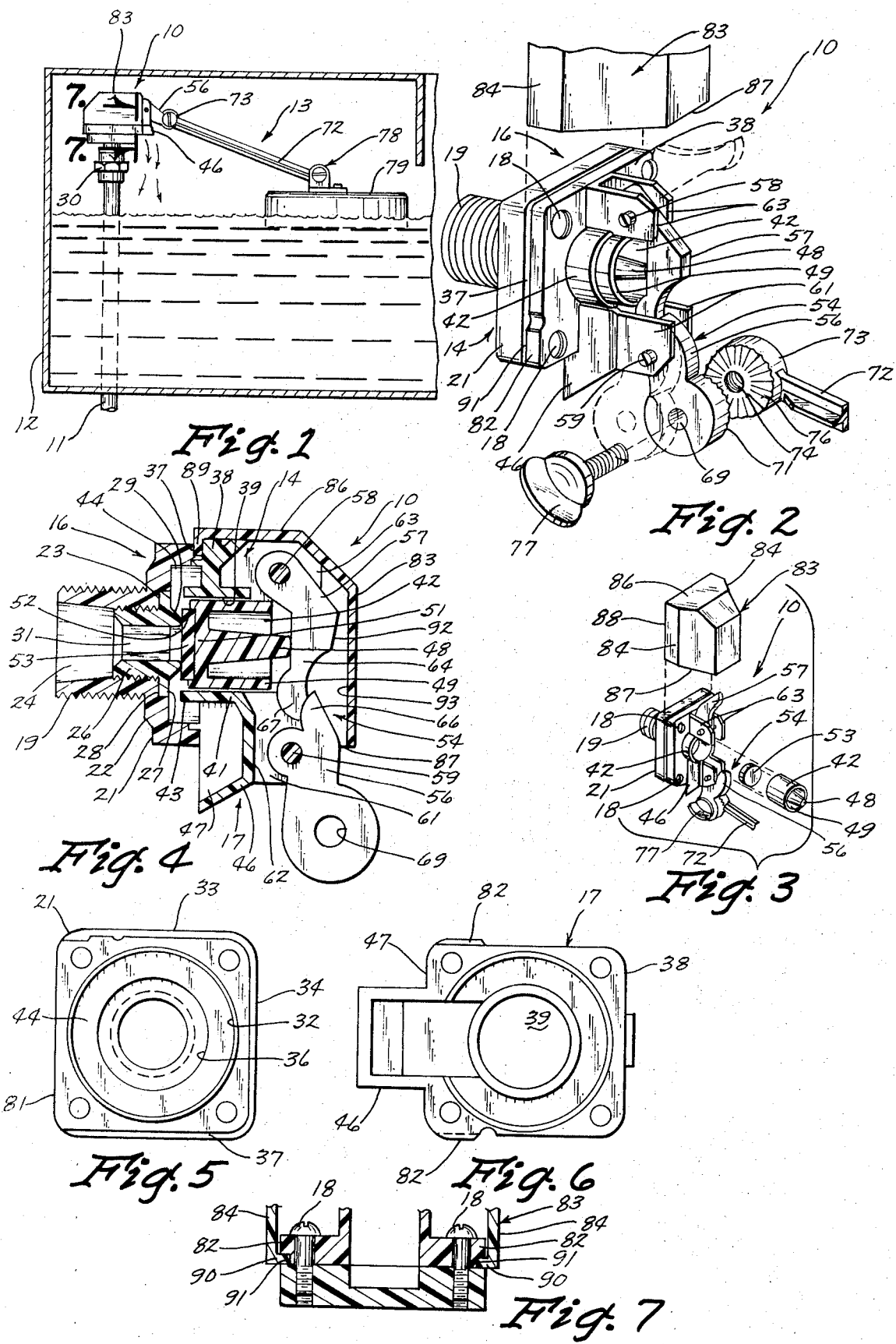

FLOAT VALVE ASSEMBLY

SUMMARY OF THE INVENTION

The valve assembly of this invention is of a compact and simple construction and capable of efficiently controlling the water level in a water tank. The assembly may be installed in either a vertical or horizontal position and is composed of parts relatively constructed to provide for the complete servicing and maintenance of the valve assembly without requiring the use of hand tools. The valve plunger is retained in an operating position by a slidably removable stop portion, which on being removed permits access to the valve plunger for replacing or reversing the seat member thereon.

BRIEF DESCRIPTION OF THE DRAWINGS

FIG. 1 is a side elevational view of the float valve assembly of this invention shown in assembly relation with a water tank;

FIG. 2 is an enlarged perspective view of the float valve assembly having parts thereof exploded to more clearly show its construction;

FIG. 3 is a reduced perspective view illustrated similarly to FIG. 2 and showing the valve plunger exploded;

FIG. 4 is a sectional view taken longitudinally through the valve assembly;

FIG. 5 is an end elevational view of the seat supporting section of the valve body member;

FIG. 6 is an end elevational view of the plunger supporting section of the valve body member; and FIG. 7 is an enlarged detail sectional view taken on line 7—7 in FIG. 1.

DETAILED DESCRIPTION OF THE INVENTION

Referring to the drawing, the float valve assembly of this invention, indicated generally as 10 in FIG. 1, is shown horizontally mounted on an upright water supply pipe 11 for a water tank 12. A float arm unit 13, extended generally horizontally actuates the float valve assembly 10 in response to variations of the water level in the tank 12.

The float valve assembly (FIGS. 2 and 4) has a valve body member 14 comprised of a valve seat supporting section 16 and a valve plunger supporting section 17 relatively constructed for mating engagement and securement together by screws 18. The valve seat supporting or body section 16 is integrally formed with a tubular water inlet connection 19 and a square pan shaped base portion 21 having a bottom wall 22 formed with a central opening 23 that is continuous with the bore 24 of the inlet connection 19. The bore 24 adjacent the opening 23 is internally threaded to threadably receive a tubular valve seat 26 to a position defined by the engagement of an annular flange 27 on the valve seat with a shoulder 28 formed in the inner surface of the bottom wall 22 in a concentric relation about the bore 24. When thus received the bore 24 an annular seating surface 29 on the valve seat 26 projects inwardly of the wall 22 for a purpose to appear later. A longitudinal bore 31 in the valve seat 26 is of a polygonal shape in transverse cross section to facilitate assembly and removal of the valve seat by a mating shaped wrench. The outer peripheral surface of the water inlet connection 19 is threaded for direct assembly with the water pipe 12 (FIG. 1) by a suitable coupling 30.

As best appears in FIG. 5, the side wall 33 of the pan shaped portion of the valve body section 16 has an inner surface 32 of a circular shape and an outer surface 34 of a square shape. The inner surface 32 is formed with a top peripheral recess 36 and the outer surface 34 with a continuous top recess 37 in three sides thereof.

The valve plunger supporting or body section 17 (FIGS. 4 and 6) has a square shaped base portion 38 formed with a central bore 39 defined by an annular side wall 41 which constitutes a cylinder for reciprocally supporting a valve plunger 42. As best appears in FIG. 4, the side wall 41 projects outwardly from opposite sides of the base 38. Formed on the base 38 in a concentrically spaced relation with the projected end 43 of the annular side wall 41 is an annular bead 43 of a size and shape corresponding to the annular recess 36 in the inner surface 32 of the side wall 33 so as to be receivable therein in the assembly of the body sections 16 and 17.

When thus assembled (FIG. 4) there is formed between the body member sections 16 and 17 a water chamber 44 that has a discharge outlet 46. The outlet 46 (FIG. 6) is integrally formed with the body section 17 and extends laterally through the side 47 of the base 38 for junction with the outer surface of the annular side wall 41. As shown in FIGS. 4 and 6, the outlet 46 is of a generally rectangular shape in transverse cross section having an open bottom side 47 which lies in that surface of the base 38 which forms one wall of the water chamber 44. The open side 47 of the discharge outlet 46 is thus open to the chamber 44 to provide for a flow of water therefrom into the tank 12.

The valve plunger 42 (FIG. 4) is of a generally cup-shape and has a centrally upstanding post 48 which projects outwardly from the cup wall 49. The outer surface of the base wall 51 of the valve plunger is formed with a circular cavity 52 for frictionally receiving a rubber disc member 53 which is engageable in a water sealing relation with the annular seating surface 29. It is thus seen that when the valve plunger 42 is in seated engagement with the valve seat 26, the float valve assembly 10 is closed and that when the valve plunger 42 is out of such seated engagement, the float valve assembly is open to permit the flow of water from the water pipe 11 into the chamber 44 and through the outlet 46 into the water tank 12.

Actuation of the valve plunger 42 is accomplished by the float arm unit 13 through an articulated lever assembly 54, comprised of what will be referred to as an actuating lever 56 and a stop lever 57 (FIGS. 2 and 4). The levers 56 and 57 are pivotally supported at 58 and 59, respectively, to opposite sides of the valve plunger 42 for pivotal movement in a common plane extended axially of the valve plunger. The pivot 59 for the actuating lever 56 is supported in a pair of spaced ears or lugs 61 that project upwardly from the top wall 62 of the discharge outlet 46. The pivot 58 is supported in a pair of upstanding lugs 63 on the base portion 38. The levers 56 and 57 are pivotally movable between corresponding ones of the lugs 61 and 63, respectively.

The stop lever 57 is of a generally L-shape with a short leg supported on the pivot 58 and a long leg 64 extended transversely across the valve plunger 42 for engagement with the free end of the post 48 of the valve plunger 42. The actuating lever 56 is pivotally supported intermediate the ends thereof and is formed at one end with a finger 66 arranged in an overlying relation with the free end of the long leg 64. The opposite end of the actuating lever 66 (FIGS. 1 and 2) is of a disc shape having a central opening 69 and a serrated face 71. The float arm 72 of the float unit 13 has one end 73 of a corresponding disc shape having a central threaded opening 74 and a serrated face 76. With the serrated faces 71 and 76 adjacent each other, the float arm 72 is rotatably adjustable relative to the lever 56 by manipulation of a wing screw 77 extended through the opening 69 for threaded engagement within the opening 74. A similar adjustment is provided at the opposite end of the float arm 72 by the adjustable connection 78 whereby the float 79 is rotatably adjustable relative to the float arm 72.

As previously mentioned the side wall 33 of the body section 16 is formed on three sides thereof with a continuous recess 37. In the assembly of the body sections 16 and 17 the discharge outlet 46 (FIGS. 4 and 6) is extended outwardly from the non-recessed side 81 of the base portion 21 of the body section 16. In this connection it is to be noted that the corners of the base 38 of the body section 17 arranged to opposite sides of the discharge outlet 46 (FIGS. 6 and 7) have outwardly projected abutment portions 82. To maintain the levers 56 and 57 in overlying operative engagement, and in turn the valve plunger 42 within the cylinder 41, there is provided a hood member 83 (FIGS. 3 and 4) having side walls 84, an end wall 86, an open end 87 and an open bottom 88. The side walls 84 and end wall 86 are formed with a continuous inwardly extended lip 89. The hood member 83 is assembled with the valve body member 14 by locating the open end 87 thereof opposite the stop lever 57 and then sliding those portions of the lip 89 on the side walls 84 within the portions of the recess 37 to opposite sides of the outlet 46 to a position defined by the reception of the lip on the end wall 86 within the groove 90 (FIG. 4) formed by that portion of the recess 37 opposite the outlet 46 with the base 38. With the hood member 83 in its assembly position shown in FIG. 4, the projections 82 form grooves 91 FIG. 7) with the adjacent opposite portions of the recess 37, which cooperate with the groove 90 to lock the hood member 83 on the valve body member 14.

On a downward movement of the float 79, as shown in FIG. 1, the actuator lever 56 is rotated in a clockwise direction, as viewed in FIG. 4, whereby the valve plunger 42 is unseated by the pressure applied thereon from the water source 11. Opening movement of the plunger 42 is permitted to a position defined by the engagement of the stop 92 on the lever 57 with the top wall 93 of the hood member 83. The stop 92 is at substantially the junction of the long leg 64 with the short leg of the stop lever 57. When the water in the tank 12 reaches a predetermined level the actuator lever 56 is moved by the float unit 13 to engage and move the stop lever 57 against the valve plunger 42 which, in turn, is moved into seating engagement with the seating surface 29 to close the valve assembly 10.

In the event the float valve assembly 10 is to be serviced it is only necessary, as illustrated in FIG. 3, to first remove the slidable hood 83 from the valve body member 14 and then swing the levers 56 and 57 away from each other to their positions shown in FIG. 3 out of the path of axial movement of the valve plunger 42. The plunger 42 may thus be readily removed from the body section 17 to either replace or reverse the disc member 53 should such servicing be necessary. On return of the valve plunger within the cylinder 41, it is only necessary to relatively move the levers 56 and 57 to their positions shown in FIG. 4 and replace the hood member 83. The valve assembly 10 is thus capable of being quickly and easily serviced in a minimum of time without the use of any tools.

Although the invention has been described with respect to a preferred embodiment thereof, it is to be understood that it is not to be so limited since changes and modifications can be made therein which are within the full intended scope of this invention as defined by the appended claims.

We claim:

1. A float valve assembly for a stock water tank and the like comprising:
   a. a valve body having an inlet section for connection with a source of water under pressure,
   b. a valve seat in said inlet section,
   c. a valve plunger movably supported in said valve body for axial movement into and out of a seated position with said valve seat,
   d. a first lever member pivoted at one end on said valve body to one side of said valve plunger for pivotal movement about an axis normal to the axis of said valve plunger from a first position extended transversely across and in contact engagement with said valve plunger to a second position out of the path of axial movement of said valve plunger,
   e. a second lever member pivoted at one end on said valve body to the opposite side of said valve plunger for pivotal movement about an axis parallel to the axis of said first lever member, said one end of the second lever member being in overlying contact engagement with the free end of said first lever member, when the first lever member is in the first position therefor,
   f. a float member connected to the free end of the second lever member, and
   g. a removable stop member on said valve body engageable with the first lever member to limit the open position of said valve plunger relative to said valve seat, said first lever member on removal of said stop member being movable to the second position therefor to provide for the removal of the valve plunger from the valve body.

2. A float valve assembly for a water tank comprising:
   a. a valve body member having an inlet section for connection with a source of water under pressure and an outlet section open to said inlet section,
   b. a valve unit for opening and closing said inlet section including a valve seat in the inlet section, and a valve plunger slidably mounted in said valve body member for movement into and out of a seated relation with said valve seat, p1 c. a pair of coacting lever members pivoted on said valve body member at opposite sides of said valve plunger for relative pivotal movement in a common plane about axes normal to the path of movement of said valve plunger, with one of said lever members extended into said path of movement for engagement with the end of the valve plunger remote from said valve seat, said lever members having the adjacent end sections thereof in an overlapped relation with the other of said lever members overlying said one lever member, d. said lever members pivotally movable to first positions to hold said valve plunger in seated engagement with said valve seat to close said valve unit; to second positions wherein said valve plunger is unseated from said valve seat; and to third positions wherein said lever members are out of the path of movement of said valve plunger, e. a float arm assembly connected to the other of said lever members;

f. a removable stop portion on said valve body engageable with said one lever member to define the second positions of said lever members, said lever members on removal of said stop portion, being movable to the third positions therefor wherein said valve plunger is removable from the valve body member.

3. The float valve assembly according to claim 2, including:

a. a housing member for said one lever member having a wall portion arranged in a plane normal to the axis of said valve plunger, said wall portion having a section constituting said stop position, and b. means movably supporting said housing on said valve body member for movement into and out of a covering relation with said one lever member.

4. The float valve assembly according to claim 2, wherein:

a. said one lever member is of a length such that the adjacent end section thereof terminates adjacent the pivotal axis for said other lever member.

5. The float valve assembly according to claim 2, wherein:

a. said valve plunger includes a disc shape resilient member in the end thereof facing said valve seat for seating engagement with said valve seat, and b. said last mentioned end of the valve plunger has a cavity of a size and shape to frictionally receive said resilient member therein.

6. The float valve assembly according to claim 2, wherein:

a. said valve seat is of a cylindrical tubular shape having a threaded outer peripheral surface, and b. said inlet section has a threaded bore portion to threadably receive said valve seat therein;

c. said valve seat having a bore of a polygonal shape in transverse cross section.

* * * * *